US007143745B1

(12) United States Patent
Yokono

(10) Patent No.: US 7,143,745 B1
(45) Date of Patent: Dec. 5, 2006

(54) ELECTRONIC THROTTLE CONTROL UNIT FOR ENGINE

(75) Inventor: Michihisa Yokono, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 16 days.

(21) Appl. No.: 11/350,805

(22) Filed: Feb. 10, 2006

(30) Foreign Application Priority Data

Sep. 12, 2005 (JP) ............................. 2005-263710

(51) Int. Cl.
*F02D 11/10* (2006.01)
*F16K 31/02* (2006.01)

(52) U.S. Cl. ....................................... 123/399; 123/361

(58) Field of Classification Search ................ 123/399, 123/361; 251/129.01; 73/118.2
See application file for complete search history.

(56) References Cited

U.S. PATENT DOCUMENTS

| | | | | |
|---|---|---|---|---|
| 6,089,535 A * | 7/2000 | Mizutani et al. | ....... | 251/129.04 |
| 6,123,056 A * | 9/2000 | Shimada et al. | ............ | 123/399 |
| 6,647,958 B1 * | 11/2003 | Yokoyama et al. | ......... | 123/361 |
| 2006/0060168 A1 * | 3/2006 | Watanabe et al. | ........... | 123/399 |

FOREIGN PATENT DOCUMENTS

| | | |
|---|---|---|
| JP | 06-101550 A | 4/1994 |
| JP | 10-222205 A | 8/1998 |
| JP | 2003-028001 A | 1/2003 |

* cited by examiner

*Primary Examiner*—Hai Huynh
(74) *Attorney, Agent, or Firm*—Sughrue Mion, PLLC

(57) ABSTRACT

An electronic throttle control unit for an engine can perform precise control by using a single inexpensive AD converter. The unit includes an electronic throttle that controls an engine, a throttle opening detection section that detects the throttle opening of the electronic throttle, and a control section that controls the throttle opening to a target value in accordance with an operating condition of the engine. The throttle opening detection section includes a throttle opening sensor that generates a sensor voltage corresponding to the throttle opening, an offset part that converts the sensor voltage into a plurality of voltages with offsets, a distribution circuit for distributing the voltages with offsets to a single path, an AD converter that AD converts the voltages distributed to the single path; and a distribution switching section that performs distribution switching control of the distribution part, wherein the distributed voltages are detected as a final throttle opening to be controlled.

4 Claims, 6 Drawing Sheets

ELECTRONIC THROTTLE CONTROL UNIT FOR ENGINE

BACKGROUND OF THE INVENTION

1. Field of the Invention

The present invention relates to an electronic throttle control unit for controlling an automotive engine for example, and more particularly, to a new technique in which accuracy in detecting a throttle opening can be improved by using an inexpensive AD converter with a low resolution.

2. Description of the Related Art

In general, in an electronic throttle control unit for an engine, the degree of opening of an electronic throttle is controlled in a feedback manner so as to coincide with a target throttle opening that is appropriately calculated in accordance with the operating condition of a vehicle on which the unit is installed (see, for instance, a first patent document: Japanese patent application laid-open No. H10-222205).

To this end, the electronic throttle control unit (ECU) serves to AD convert an output voltage of a throttle opening sensor, calculates a target throttle opening by using the AD converted value of the throttle opening (detected value), and controls the electronic throttle in a feedback manner.

In addition, particularly during idling operation, it is necessary to control the amount of air (amount of intake air) sucked into the engine in an accurate manner so as to maintain relatively low idling speed, and hence throttle control with high reliability is required.

In order to control the amount of intake air sucked into the engine in an accurate manner, it is necessary to control the electronic throttle with high accuracy, and to this end, it is also necessary to detect an output voltage value of the throttle opening sensor with a high degree of precision.

Accordingly, there has been proposed an electronic throttle control unit in which to detect a throttle opening sensor voltage in an idling speed range with a high degree of precision, an n× (n times) amplifier is provided in the control unit, and two voltages, i.e., a throttle opening sensor voltage (throttle opening voltage) output from an actuator of an electronic throttle and a voltage value obtained by amplifying the throttle opening voltage with the n× amplifier, are read in so that these two voltage values are alternatively switched from one to another in accordance with the operating range of the engine (see, for instance, a second patent document: Japanese patent application laid-open No. H6-101550).

Also, there has been proposed an electronic throttle control unit in which a throttle opening voltage is converted into a plurality of voltages with offsets, which are then read out by a plurality of AD converters or single AD converter, whereby a throttle opening voltage is detected with high accuracy based on the results of AD conversion of the respective voltage values (see, for instance, a third patent document: Japanese patent application laid-open No. 2003-28001).

Further, in the third patent document, there is also proposed a device in which the plurality of voltages with offsets converted through a transistor switch are read by the single, AD converter.

In the known electronic throttle control units for an engine, there is the following problem. That is, in the case of the electronic throttle control units described in the second and third patent documents, for instance, there is a possibility that errors in the detected values might be caused due to a difference or variation in accuracy between the plurality of AD converters, thus exerting adverse effects on throttle control.

In addition, in case where the plurality of voltages with offsets converted through the transistor switch are read by the single AD converter, there exists another problem. That is, there is a possibility that errors in the detected values might be generated due to the internal resistance of the transistor switch, thus causing adverse influences on throttle control.

Further, in case where an AD converter of a high resolution is used so as to detect the throttle opening voltage with a high degree of precision, there is also a further problem of inviting an increase in the cost of the entire unit.

SUMMARY OF THE INVENTION

The present invention is intended to solve the problems as referred to above, and has for its object to obtain an electronic throttle control unit for an engine which can not only avoid influences due to an accuracy error or difference-between AD converters by using a single inexpensive AD converter of a low resolution together with an offset part and a distribution part without the intervention of any transistor switch, as well as the influence of a detection error due to the internal resistance value of a transistor switch, but also make it possible to perform precise control of an electronic throttle based on a highly accurate throttle opening voltage (detected value) without inviting an increase in costs.

An electronic throttle control unit for an engine according to the present invention includes: an electronic throttle that controls an engine; a throttle opening detection section that detects the throttle opening of the electronic throttle; and a control section that controls the throttle opening to a target value in accordance with an operating condition of the engine. The throttle opening detection section includes: a throttle opening sensor that generates a sensor voltage corresponding to the throttle opening; an offset part that converts the sensor voltage into a plurality of voltages with offsets; a distribution circuit that distributes the voltages with offsets to a single path; an AD converter that AD converts the voltages distributed to the single path; and a distribution switching section that performs distribution switching control of the distribution part; wherein the distributed voltages are detected as a throttle opening to be controlled.

According to the present invention, it is possible to obtain an electronic throttle control unit for an engine that can perform precise control of an electronic throttle valve based on a throttle opening voltage detected with high accuracy without inviting an increase in costs.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Hereinafter, a preferred embodiment of the present invention will be described in detail while referring to the accompanying drawings.

Embodiment 1

Figure 1:
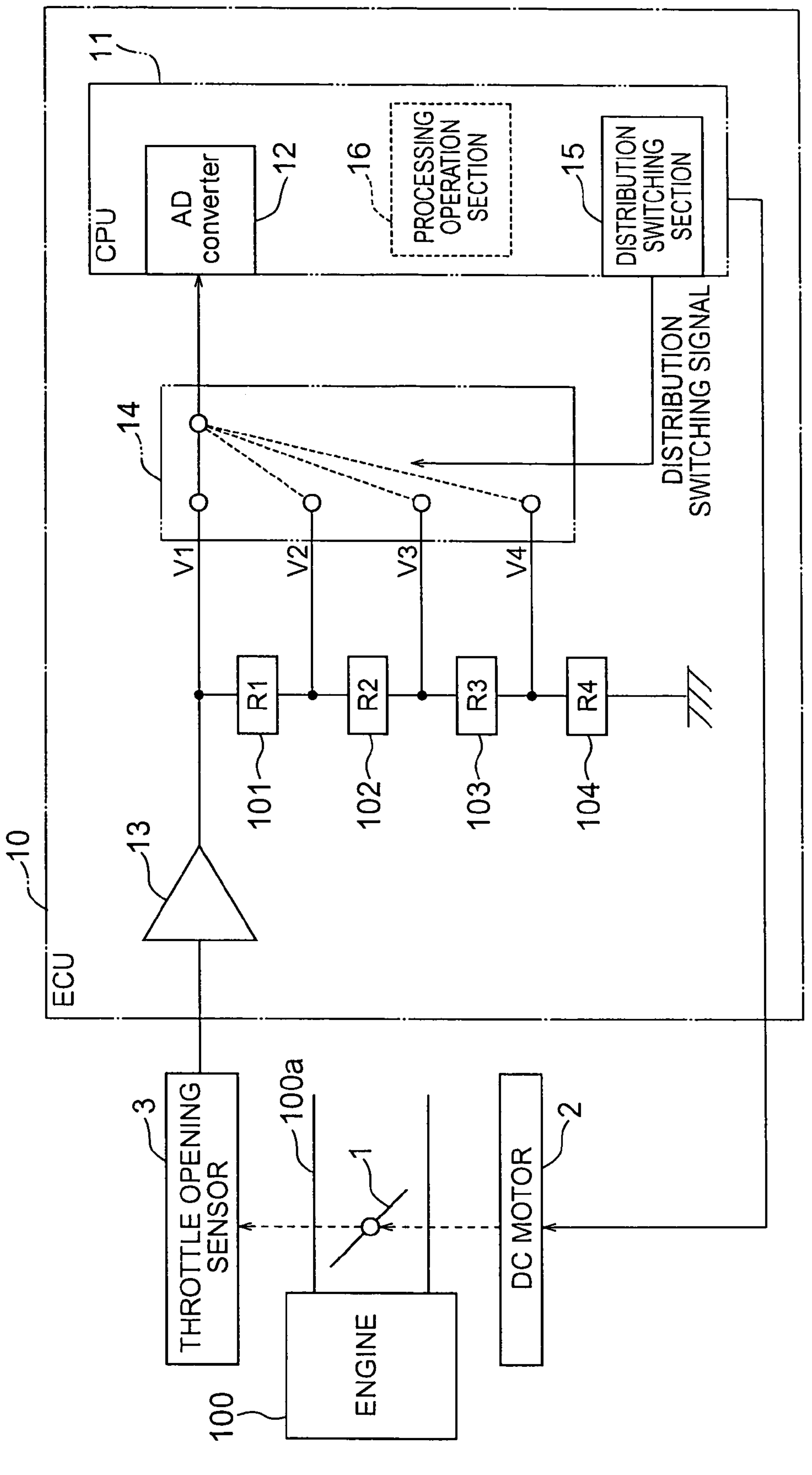
FIG. 1 is a block diagram showing an example of the hardware configuration of an electronic throttle control unit for an engine according to a first embodiment of the present invention.

FIG. 1 is a block diagram showing an electronic throttle control unit for an engine according to a first embodiment of the present invention, together with an example of the hardware configuration of the engine and its surroundings.

In FIG. 1, on an intake pipe 100*a* of an engine 100 there is installed an electronic throttle valve 1 (hereinafter referred to simply as a "throttle valve") for adjusting the amount of intake air flowing therethrough.

Mounted on the throttle valve 1 is a DC motor 2 that serves as a throttle actuator for controlling the opening of the throttle valve 1.

The throttle valve 1 and the DC motor 2 together constitute an electronic throttle for controlling the amount of intake air sucked into the engine 100.

A throttle opening sensor 3 for generating a sensor voltage corresponding to the degree of opening of the throttle valve 1 (hereinafter referred to as a throttle opening) is mounted on the throttle valve 1.

An ECU (electronic control unit) takes in the sensor voltage from the throttle opening sensor 3 as well as detection information (i.e., information on the operating condition of the engine 100) from other various kinds of sensors (not shown), and generates a driving control signal for the DC motor 2.

The ECU 10 includes a CPU 11 that constitutes a main body of a microcomputer and contains therein an AD converter, a distribution switching section 15, a processing operation section 16. Also, the ECU 10 further includes a distribution circuit (distribution part) 14 inserted at an input side of the AD converter 12, an offset circuit (offset part) comprising a plurality of resistors 101 through 104 inserted at an input side of the distribution circuit 14, and an operational amplifier 13 (buffer) inserted between an output terminal of the throttle opening sensor 3 and one input terminal of the distribution circuit 14.

The resistors 101 through 104 have impedances with mutually different resistance values R1 through R4, respectively, and they are inserted in series between an output terminal of the operational amplifier 13 and ground. As a result, the plurality of voltages with offsets V1 through V4 converted from an input voltage (the sensor voltage) are generated from individual one ends of the resistors 101 through 104, respectively.

Here, note that the individual resistance values R1 through R4 can be arbitrarily set.

The offset circuit is composed of an impedance circuit including the plurality of resistors 101 through 104 for generating the plurality of voltages with offsets V1 through V4 including an input voltage V1, and the individual resistors 101 through 104 have their one ends connected to the individual input terminals of the distribution circuit part 14, respectively.

The distribution circuit 14 has a plurality of input terminals that take in the plurality of offset voltages V1 through V4, respectively, at the same time, and a single output terminal, and serves to select, in response to a distribution switching signal from the distribution switching section 15, either one of the voltages with offsets V1 through V4 impressed to the four input terminals, respectively, to output it from its single output terminal. The output terminal of the distribution circuit 14 is connected to an input terminal of the AD converter.

In FIG. 1, there is shown a case where the output voltage V1 of the operational amplifier 13 is selected (see a solid line), and the other voltages with offsets V2 through V4 are in non-selected states (see broken lines). In this case, the voltage with the offset V1 is output from the distribution circuit 14, and input to the AD converter in the CPU 11.

Here, note that the distribution circuit 14 has switching signal input terminals that receive a switching signal so as to arbitrarily switch its output voltage into either of the input voltages V1 through V4 in response to the distribution switching signal from the distribution switching section 15.

The switching signal input terminals of the distribution circuit 14 are connected to a distribution switching section 15 in the CPU 11.

In addition, the operational amplifier 13 serves to separate the throttle opening sensor 3 side and the impedances of the resistors 101 through 104 (the offset circuit) from each other, whereby the respective resistor values R1 through R4 can be reduced and at the same time the accuracy of the AD converted value by the AD converter can be increased.

The AD converter 12 in the CPU 11 takes in the sensor voltage from the throttle opening sensor 3 through the operational amplifier 13, the resistors 101 through 104 and the distribution circuit 14 in the ECU 10 as the voltages with offsets V1 through V4, converts it into a digital voltage, and inputs it to the processing operation section 16 in the CPU 11.

The throttle opening sensor 3, the operational amplifier 13, the resistors 101 through 104 and the distribution circuit 14 in the ECU 10, and the AD converter 12 and the distribution switching section 15 in the CPU 11 together constitute a throttle opening detection section.

The throttle opening detection section detects a voltage value distributed (selected) from the voltages with offsets V1 through V4 as the throttle opening of the electronic throttle (the throttle valve 1) which becomes a final object to be control.

The throttle opening detected by the throttle opening detection section is used for control calculations of the processing operation section 16, and hence contributes to the generation of a driving control signal to the DC motor 2.

That is, the processing operation section 16 in the CPU 11 includes a throttle control section which calculates a target value of the throttle opening in accordance with the operating condition of the engine 100, and controls the degree of opening of the throttle valve 1 to the target value by driving and controlling the DC motor 2 based on a driving control signal corresponding to the target value of the throttle opening.

As shown in FIG. 1, by the provision of the resistors 101 through 104 (offset circuit) for converting the sensor voltage output from the throttle opening sensor 3 into the plurality of voltages with offsets V1 through V4, and by arbitrarily selecting a voltage value from the voltages with offsets V1 through V4, it is possible to detect the degree of opening of the throttle valve 1 in the form of the final object to be controlled with a high degree of precision.

Though not illustrated here, in case where a low-pass filter (including a resistor and a capacitor) is applied to the sensor voltage input from the throttle opening sensor 3 to the ECU 10, it is necessary to set the resistance values R1 through R4 of the individual resistors 101 through 104 to larger values so as to ensure a satisfactory dynamic range of the sensor voltage for the throttle opening.

In general, it is found that when an external impedance increases upon conversion of the sensor voltage into the plurality of voltages with offsets V1 through V4, a deviation will be generated between the input voltage and the result of AD conversion in the AD converter 12.

Accordingly, in order to avoid this, the operational amplifier 13 (buffer) is inserted for impedance conversion, as shown in FIG. 1. As a result, the resistance values R1 through R4 of the resistors 101 through 104 can be set to smaller values to such an extent that they does not influence the AD conversion in the AD converter 12.

Next, reference will be made to an operation of detecting the throttle opening with high precision according to the first embodiment of the present invention, as shown in FIG. 1, while referring to FIGS. 2 through 4. First, the resolution of the AD converter will be described.

In general, the resolution a of the AD converter 12 is represented by a bit number, and the resolution of n bits (n being a natural number) is given by the following expression (1) by the use of a reference voltage Vref for the AD converter 12.

$$a=Vref/2n \quad (1)$$

The resolution a given by expression (1) above indicates that a voltage that is smaller than this value can not be determined or identified.

Figure 2:
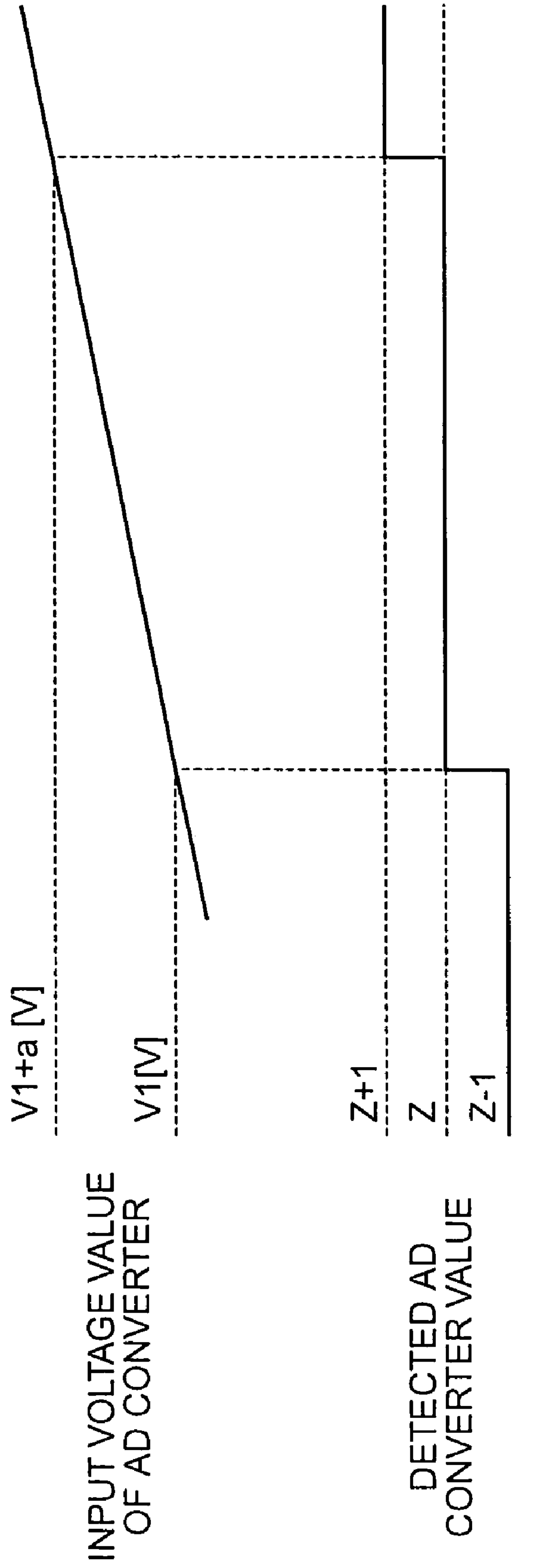
FIG. 2 is an explanatory view conceptually showing a relation between an input voltage of an n-bit AD converter and the result of AD conversion thereof according to the first embodiment of the present invention.

FIG. 2 is an explanatory view that conceptually illustrates a relation between an input voltage value (analog value) V of the AD converter 12 and an AD converted value (digital value) Z in a timing chart.

In FIG. 2, there are shown AD converted values "Z−1, Z, and Z+1" when the input voltage value of the AD converter 12 rises from "V1 [V]" to "V1+a [V]".

In FIG. 2, in the case of using the AD converter 12 with a resolution of "a [V]" (n bits), as shown in expression (1), assuming that an input voltage with a resultant AD converted value (the result of AD conversion) of "Z" is set as "V1 [V]", an input voltage with a resultant AD conversion value of "Z+1" becomes "V1+a [V]".

In other words, in case where an input voltage V lying within a range of "V1≦V<V1+a" is subjected to AD conversion, an AD converted value obtained as a result of the AD conversion becomes Z (a fixed or constant value).

Figure 3:
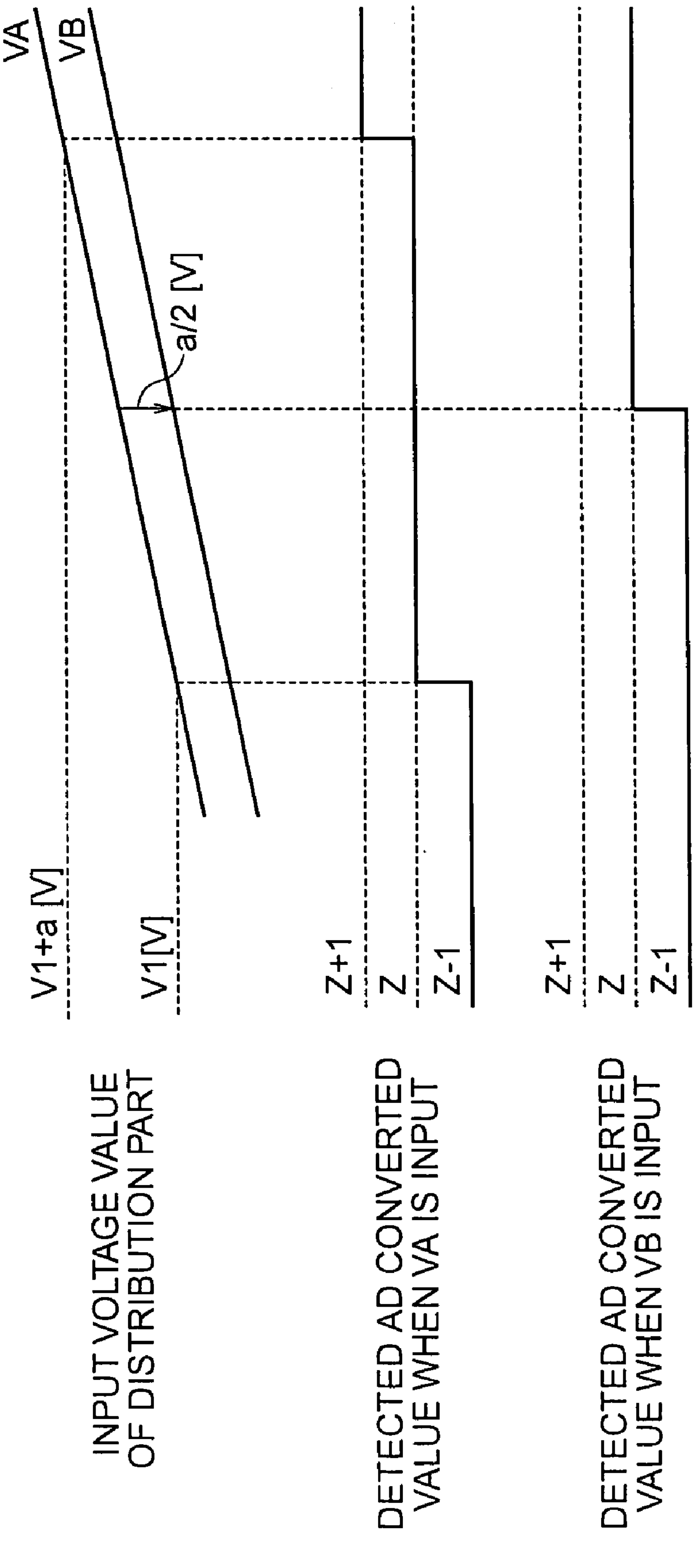
FIG. 3 is an explanatory view conceptually showing a voltage detection process with high precision according to the first embodiment of the present invention.

FIG. 3 is an explanatory view that conceptually illustrates an increased accuracy of the input voltage detection processing of the AD converter 12 in a timing chart.

In FIG. 3, there is illustrated a method of enabling the detection of an input voltage by the use of the AD converter 12 having a resolution of a (n bits) with high accuracy equivalent to the case of using an AD converter having a resolution of a/2 (n+1 bits).

In FIG. 3, the detection of a voltage position with a resolution of a/2 (a high degree of precision) can be made by the AD converted value of an input voltage (a voltage with an offset) VA and the AD converted value of a voltage VB (=VA−a/2) which is obtained by adding an offset of "−a/2 [V]" to the input voltage VA.

In other words, the voltage with an offset VB is generated from the input voltage VA by using the offset circuit (resistors 101 through 104, and the individual input voltages VA, VB are distributed to the AD converter 12 in the CPU 11 through the distribution circuit 14.

The AD converter 12 AD converts the individual input voltages VA, VB with a resolution of a (n bits), and the processing operation section 16 uses the AD converted voltage value for control calculation processing.

As a result, it is possible to acquire a control resolution equivalent to that obtained in the case of using the value converted by the AD converter 12 of a resolution of a/2 (n+1 bits).

In addition, the above calculation processing is applied to the sensor voltage from the throttle opening sensor 3, so that $2^b$ voltages which are successively offset by "$-a/2^b$ [V] (b being a natural number)" from one another are input to the AD converter 12 with a resolution of a [V] (n bits), where they are converted from analog into digital form for comparison with one another, whereby the voltage (the throttle opening) can be detected with high accuracy substantially equivalent to that obtained in the case of using an AD converter of "(n+b) bits".

Accordingly, as shown in FIG. 1, the generation of voltages with offsets V1, V2, V3, V4, . . . (i.e., V2=V1−$a/2^b$ [V], V3=V2−$a/2^b$ [V], V4=V3−$a/2^b$ [V], . . . ) from the input voltage V1 [V] by using the resistors 101 through 104 and an arbitrary number of series resistors in the ECU 10 becomes effective for an increase in accuracy of the detection of the throttle opening.

Hereinafter, the individual voltages with offsets V1, V2, V3, V4, . . . are distributed to the AD converter 12 by means of the distribution switching signal from the distribution switching section 15 in the CPU 11, whereby they are converted from analog into digital form by using the AD converter 12 with a resolution of n bits.

In addition, the processing operation section 16 (throttle control section) in the CPU 11 controls the DC motor 2 and the throttle valve 1 by using the added values as a result of the AD conversion. Thus, it is possible to obtain a control resolution equivalent to that obtained in the case of control by using the converted values of the AD converter of (n+b) bits.

It is found that for instance, in order to control the idling speed (several hundred rpm) of the engine 100 with a sufficiently high degree of precision, it is necessary to AD convert the sensor voltage from the throttle opening sensor 3 by using an AD converter with a resolution of 12 bits or more.

In FIG. 1, the four voltages with offsets V1 through V4 are generated by using the four resistors 101 through 104, so an increase in accuracy of two bits can be made.

Accordingly, hereinafter, reference will be made to the processing when the throttle opening in the vicinity of idling speed is detected substantially with a high degree of precision of "12 bits" by using the AD converter 12 of "10 bits" for instance.

Figure 4:
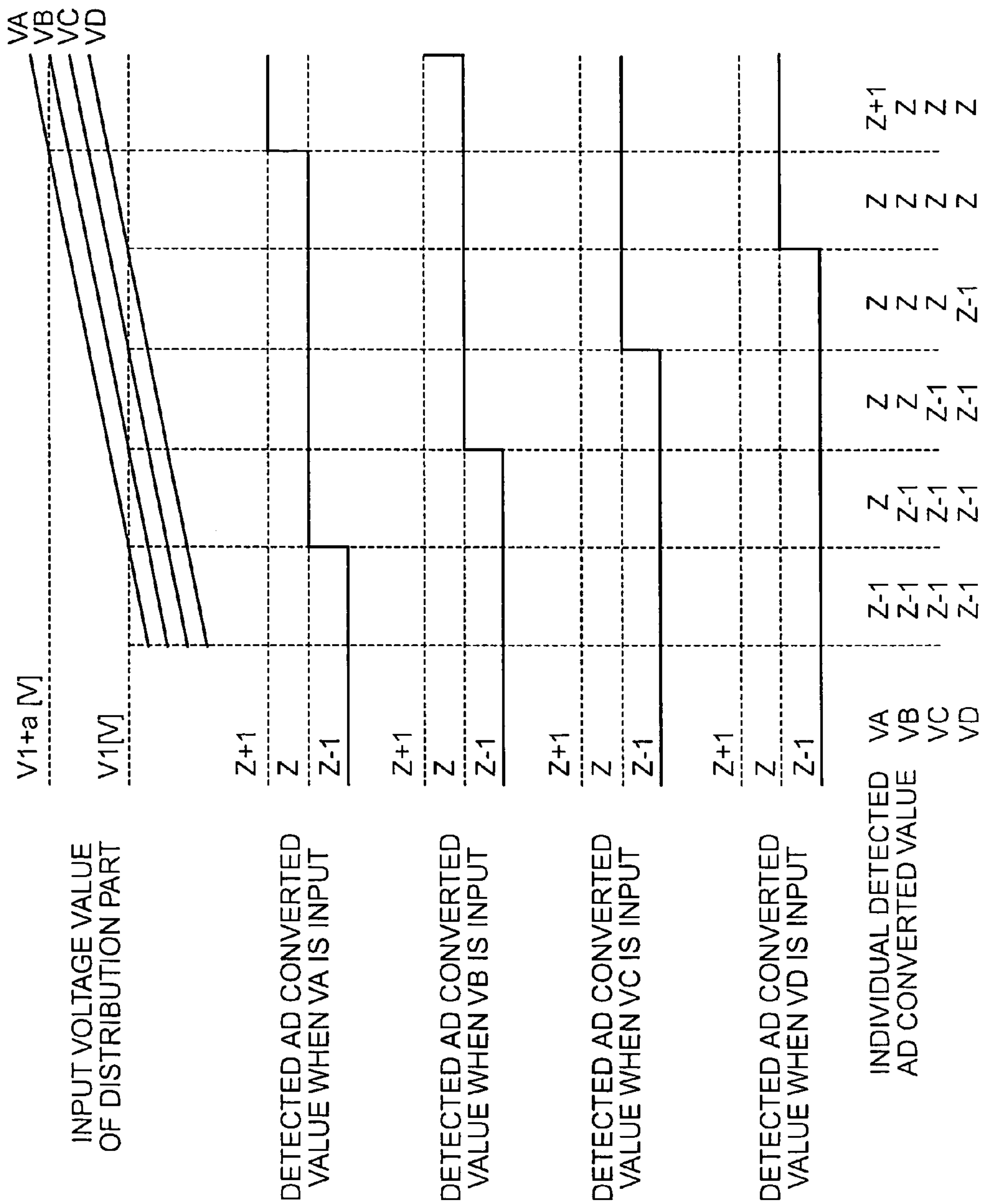
FIG. 4 is an explanatory view conceptually showing another voltage detection process with high precision according to the first embodiment of the present invention.

FIG. 4 is an explanatory view that conceptually illustrates, similar to FIG. 3, the increased accuracy of the input voltage detection processing of the AD converter 12 in a timing chart.

In FIG. 4, there are shown the results of AD conversion when four voltages with offsets VA through VD (corresponding to V1 through V4) input to the distribution circuit 14 are respectively input to the AD converter 12 of 10 bits.

As shown in FIG. 4, by comparing the individual results of AD conversion with one another in the CPU 11, it is possible to achieve a conversion accuracy of 12(=10+2) bits.

Now, assuming that the reference voltage Vref for the AD converter 12 of 10 bits is 5 [V], the resolution a of the AD converter 12 is given by the following expression (2), from the above-mentioned expression (1).

$$a = 5/2^{10} \approx 4.8\ [\text{mV}] \quad (2)$$

Accordingly, in order to perform detection substantially with a resolution of 12 bits, the above-mentioned natural number b is set as 2(=12−10), and an offset VOF for the individual voltages with offsets V1 through V4 is obtained, as shown by the following expression (3).

$$VOF = a/2^2 = a/4 \approx 1.2\ [\text{mV}] \quad (3)$$

Accordingly, the resistors 101 through 104 (see FIG. 1) generate voltages with offsets VB through VD (i.e., VB (=V2)≈VA−1.2 [mV], VC (=V3)≈VB−1.2 [mV], VD (=V4)≈VC−1.2 [mV]) based on the sensor voltage VA (corresponding to a divided voltage V1) input from the throttle opening sensor 3, as shown in FIG. 4.

Also, the AD converter 12 of 10 bits AD converts the individual voltages with offsets VA through VD (V1 through V4), respectively, compares the individual results of AD conversion with one another, and detects a throttle opening (corresponding to the result of (VA+VB+VC+VD)) of a resolution 2 bits higher than the original as an object to be controlled.

However, the offset circuit shown in FIG. 1 voltage divides the input voltage V1 by means of the resistors 101 through 104 to generate the voltages with offsets V2 through V4, so if, for example, the input voltage V1 varies, the voltage with an offset V2 also varies, and thus does not necessarily coincide precisely with the above-mentioned voltage value (V1−1.2 [mV]).

In case where it is desired to control the throttle valve 1 with a high degree of precision only during idling, however, the resistance values R1 through R4 of the individual resistors 101 through 104 need only be set in such a manner that the voltages with offsets V2 through V4 in the vicinity of the sensor voltage from the throttle opening sensor 3 at the time of idling become as represented by the following expression (4).

$$V2 \approx V1 - 1.2\ [\text{mV}]$$

$$V3 \approx V2 - 1.2\ [\text{mV}]$$

$$V4 \approx V3 - 1.2\ [\text{mV}] \quad (4)$$

For example, assuming that the sensor voltage detected at idling is about 0.7 [V], the individual resistor values R1 through R4 are set as represented by the following expression (5).

$$R1 = R2 = R3 = 18\ [\Omega]$$

$$R4 = 10\ [\text{k}\Omega] \quad (5)$$

Next, reference will be made to the precise throttle opening detection processing according to the four kinds of voltages with offsets V1 through V4 input to the AD converter 12 while referring to explanatory views of FIGS. 5 and 6.

Figure 5:
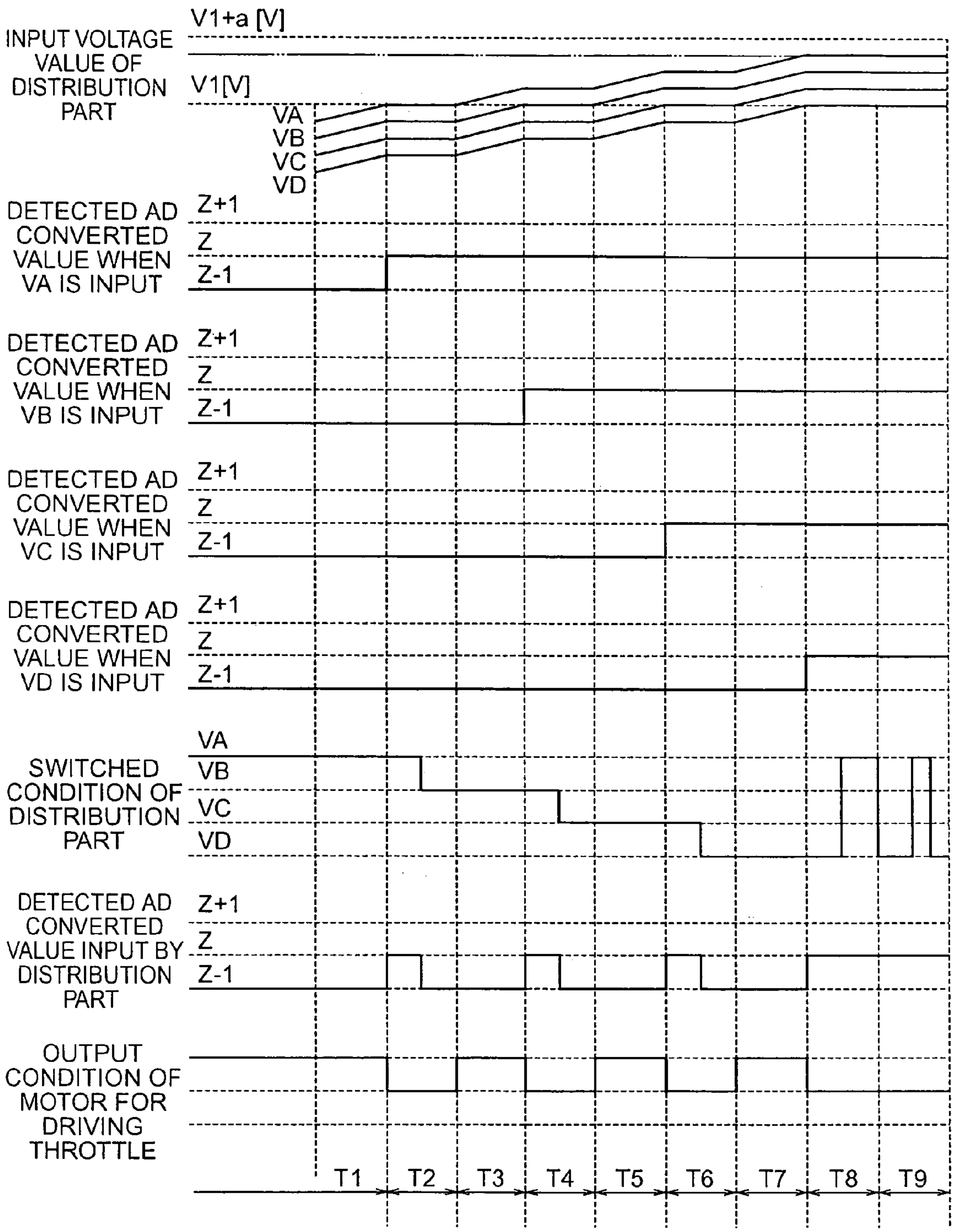
FIG. 5 is an explanatory view conceptually showing a further voltage detection process with high precision according to the first embodiment of the present invention.

FIG. 5 is an explanatory view that conceptually illustrates, similar to FIG. 4, the increased accuracy of the input voltage detection processing of the AD converter 12 in a timing chart.

As stated above, the throttle valve 1 of the electronic throttle is operatively connected with the DC motor 2 that is driven by a driving control signal from the ECU 10, so the sensor voltage changes in association with the operation of the throttle valve 1.

Figure 6:
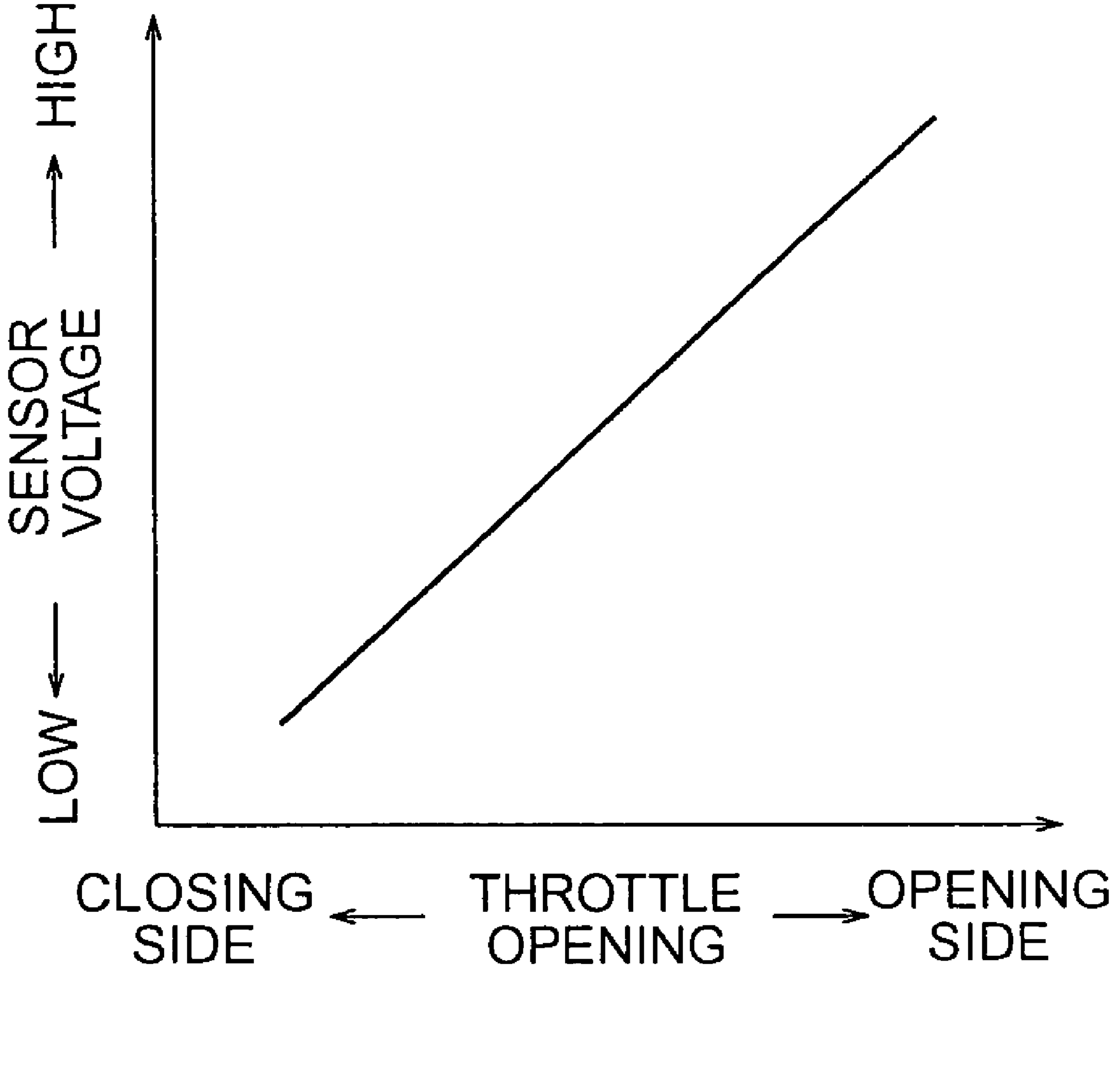
FIG. 6 is an explanatory view showing a relation between the throttle opening of an electronic throttle and the output voltage (sensor voltage) of a throttle opening sensor used in the first embodiment of the present invention.

FIG. 6 shows the operating characteristics of the throttle valve 1 and the throttle opening sensor 3 used in the first embodiment of the present invention.

In FIG. 6, the axis of abscissa represents actual the throttle opening of the throttle valve 1, and the axis of ordinate represents the sensor voltage output from the throttle opening sensor 3.

As shown in FIG. 6, the sensor voltage (the output voltage of the throttle opening sensor 3) changes linearly (like a straight line) in association with the operation of the throttle valve 1, so it rises in accordance with the operation to an opening side of the throttle valve 1. In addition, when the degree of opening of the throttle valve 1 is held constant or fixed, the sensor voltage is also held at a constant or fixed voltage corresponded to the constant or fixed degree of opening.

In FIG. 5, a voltage level indicated by an alternate long and two short dashes line is a target throttle opening voltage Vo (hereinafter referred to as a "target opening voltage"), and is equivalent to the sensor voltage value corresponding to a target control opening of the throttle valve 1.

Here is shown the throttle opening detection processing in the case where the divided voltage V1 (sensor voltage) input to the distribution circuit 14 is controlled to rise from an initial state lower than the target opening voltage Vo up to the target opening voltage Vo.

The target opening voltage Vo, if represented by using the divided voltage V1 and the resolution a, is V1+(a/4)×3 [V], which is larger than the divided voltage V1 [V] but smaller than V1+a [V].

Also, similar to the above-mentioned (see FIGS. 2 through 4), the value that is obtained by AD converting the divided voltage V1 by means of the AD converter 12 is assumed to be Z.

In a period T1 in FIG. 5, an input voltage VA is input from the distribution circuit 14 to the AD converter 12.

At this time, the input voltage VA is smaller than the AD converted value Z of the divided voltage V1, so the CPU 11 drives the throttle valve 1 to be moved to its opening side.

In the following period T2, the input voltage VA to the AD converter 12 arrives at the AD converted value Z, so the throttle valve 1 is held at the degree of opening at that time.

In addition, the distribution switching signal from the distribution switching section 15 in the CPU 11 is switched to a selection signal of the input voltage VB, with the degree of opening of the throttle valve 1 being held as it is.

As a result, the input voltage from the distribution circuit 14 to the AD converter 12 is switched from VA to VB.

At this time, the AD converted value of the input voltage VB is "Z−1", and it is detected that the sensor voltage arrives at the divided voltage V1.

In the following period T3, it is detected that the sensor voltage (input voltage VB) is lower than the target opening voltage Vo, so the CPU 11 drives the throttle valve 1 to be moved to its opening side.

In the following period T4, the input voltage VB to the AD converter 12 arrives at the AD converted value Z, so the throttle valve 1 is held at the degree of opening at that time.

Then, the distribution switching signal from the distribution switching section 15 is switched to a selection signal of the input voltage VC, with the degree of opening of the throttle valve 1 being held as it is.

As a result, the input voltage from the distribution circuit 14 to the AD converter 12 is switched from VB to VC.

At this time, the AD converted value of the input voltage VC is "Z−1" and it is detected that the sensor voltage arrives at "V1+(a/4)".

In the following period T5, it is detected that the sensor voltage (input voltage VC) is lower than the target opening voltage Vo, so the CPU 11 drives the throttle valve 1 to be moved to its opening side.

In the following period T6, the input voltage VC to the AD converter 12 arrives at the AD converted value Z, so the throttle valve 1 is held at the degree of opening at that time.

Subsequently, the distribution switching signal from the distribution switching section 15 is switched to a selection signal of the input voltage VD, with the degree of opening of the throttle valve 1 being held as it is.

As a result, the input voltage from the distribution circuit 14 to the AD converter 12 is switched from VC to VD.

At this time, the AD converted value of the input voltage VD is "Z−1", and it is detected that the sensor voltage arrives at "V1+(a/4)×2".

In the following period T7, it is detected that the sensor voltage (input voltage VD) is lower than the target opening voltage Vo, so the CPU 11 drives the throttle valve 1 to be moved to its opening side.

In the following period T8, the input voltage VD to the AD converter 12 arrives at the AD converted value Z, so the throttle valve 1 is held at the degree of opening at that time.

Thereafter the distribution switching signal from the distribution switching section 15 is switched to a selection signal of the input voltage VA, with the degree of opening of the throttle valve 1 being held as it is.

As a result, the input voltage from the distribution circuit 14 to the AD converter 12 is switched from VD to VA.

At this time, the AD converted value of the input voltage VA is "Z−1", and it is detected that the sensor voltage arrives at "V1+(a/4)×3" (=Vo).

That is, in the period T8, it is detected that the sensor voltage coincides with the target opening voltage Vo.

Thus, due to the detection that the sensor voltage coincides with the target opening voltage Vo, the degree of opening of the throttle valve 1 is held as it is, but in the engine 100, the throttle valve 1 might be subjected to an external force such as by intake air, etc., so there is a possibility that the degree of opening of the throttle valve 1 might be varied.

Accordingly, in a period T9 following the period T8, by switching the voltage distributed to the AD converter 12 from VA to VD in a periodic manner, and comparing the input voltages VD and VA with each other, it is detected whether the throttle opening can be held at the target value.

Since the resolution required for controlling the degree of opening of the throttle valve 1 varies according to the operating condition of the engine 100, so the switching period and timing of the distribution circuit 14 also vary in accordance with the operating condition of the engine 100.

As described above, the electronic throttle control unit for an engine according to the present invention includes the throttle opening sensor 3 for generating a sensor voltage corresponding to the degree of opening of the throttle valve 1, the resistors 101 through 104 (offset circuit) for converting the sensor voltage output from the throttle opening sensor 3 into the plurality of voltages with offsets V1 through V4, the distribution circuit 14 for distributing the voltages with offsets V1 through V4 to a single path, the AD converter 12 for AD converting the voltages with offsets V1 through V4 distributed to the single path, the throttle opening detection section having the distribution switching section 15 for performing the distribution switching control of the distribution circuit 14, and the processing operation section 16 (control section) for controlling the throttle opening to a target value in accordance with the operating condition of the engine 100, wherein the voltages with offsets V1 through V4 are detected as the throttle opening (object to be controlled) by means of the throttle opening detection section using the single inexpensive AD converter 12 with a low resolution. Accordingly, there is achieved an advantageous effect that an electronic throttle control unit for an engine can be obtained which is capable of avoiding adverse influences due to an accuracy error of the AD converter 12 as well as the generation of a detection error due to the internal resistance value of the transistor switch, and of performing precise control of the electronic throttle valve based on the throttle opening voltage detected with high accuracy without inviting an increase in costs.

In addition, the offset circuit includes the resistors 101 through 104 (impedances), and the throttle opening detection section includes the operational amplifier 13 (buffer) inserted between the throttle opening sensor and the offset circuit, and the operational amplifier 13 serves to separate a throttle opening sensor 3 side and an impedance side. With such an arrangement, the impedances (resistance values R1 through R4) of the offset circuit can be reduced, whereby the conversion accuracy of the AD converter 12 can be further improved.

Moreover, the offset circuit includes the resistors 101 through 104 having mutually different impedance values (resistance values R1 through R4), respectively, that can be arbitrarily set, and the distribution circuit 14 has a plurality of input terminals, takes in the plurality of voltages with offsets V1 through V4 output from the individual terminals of the plurality of resistors 101 through 104 at the same time through the plurality of input terminals, and inputs a selected voltage to the AD converter 12. With such an arrangement, it is possible to achieve an arbitrary control resolution corresponding to a desired accuracy in the single inexpensive AD converter 12.

Further, the throttle opening is detected by alternately switching and detecting the plurality of voltages with offsets, so there is achieved an advantageous effect that the current position of the throttle opening can be detected with a high degree of precision.

Furthermore, a plurality of input voltages (VA and VD in the example of FIG. 5) to the distribution circuit 14 are alternately compared with one another even after the throttle opening voltage has arrived at the target opening voltage Vo.

Thus, even if the throttle opening is varied due to an external force such as an air stream given to the throttle valve 1 or operation inertia of the throttle valve 1, it is possible to detect a variation in the degree of opening thereby to control the throttle opening to the target value.

While the invention has been described in terms of a preferred embodiment, those skilled in the art will recognize that the invention can be practiced with modifications within the spirit and scope of the appended claims.

What is claimed is:

1. An electronic throttle control unit for an engine comprising:

an electronic throttle that controls an engine;

a throttle opening detection section that detects the throttle opening of said electronic throttle; and a control section that controls said throttle opening to a target value in accordance with an operating condition of said engine;

wherein said throttle opening detection section comprises:

a throttle opening sensor that generates a sensor voltage corresponding to said throttle opening;

an offset part that converts said sensor voltage into a plurality of voltages with offsets;

a distribution circuit that distributes said voltages with offsets to a single path;

an AD converter that AD converts said voltages distributed to said single path; and a distribution switching section that performs distribution switching control of said distribution part;

wherein said distributed voltages are detected as a throttle opening to be controlled.

2. The electronic throttle control unit for an engine as set forth in claim 1, wherein said offset part comprises impedances;

said throttle opening detection section further comprises a buffer inserted between said throttle opening sensor and said offset part; and said buffer serves to separate a throttle opening sensor side and said impedances from one another.

3. The electronic throttle control unit for an engine as set forth in claim 1, wherein said offset part comprises a plurality of resistors having mutually different impedance values that can be arbitrarily set.

4. The electronic throttle control unit for an engine as set forth in claim 1, wherein said throttle opening is detected by alternately detecting said plurality of voltages with offsets that are switched by said distribution switching section.

* * * * *